United States Patent [19]

Piasecki et al.

[11] 4,283,593

[45] Aug. 11, 1981

[54] MULTICONDUCTOR CABLE

[75] Inventors: Raymond F. Piasecki, Leonardo; Ted L. C. Kuo, Fanwood, both of N.J.

[73] Assignee: Thomas & Betts Corporation, Raritan, N.J.

[21] Appl. No.: 42,544

[22] Filed: May 25, 1979

[51] Int. Cl.[3] .......................... H02G 3/26; H01B 7/08; H01B 7/36

[52] U.S. Cl. ................................ 174/36; 174/117 FF; 174/112

[58] Field of Search ............... 174/36, 117 F, 117 FF, 174/112, 115

[56] References Cited

U.S. PATENT DOCUMENTS

| | | | |
|---|---|---|---|
| 2,106,048 | 1/1938 | Candy, Jr. | 174/112 |
| 3,469,016 | 9/1969 | Shelton | 174/36 |
| 3,960,430 | 6/1976 | Bunnell et al. . | |
| 3,984,621 | 10/1976 | Propst . | |
| 4,002,393 | 1/1977 | Merry et al. . | |
| 4,030,801 | 6/1977 | Bunnell . | |
| 4,054,353 | 10/1977 | Saunders et al. . | |

OTHER PUBLICATIONS

NASA Technical Memorandum TM X-64916, 3/75.
NASA Technical Memorandum TM X-64887, 8/74.
NASA MSFC-SPEC-494A, 4-30-73.
"Tentative Interim Amendment to the 1978 National Electrical Code", National Fire Protective Assoc., Jan. 1978.
"A better way to wire", Telephony, Jan. 8, 1979.
"TUCC System", undated.
NASA Technology Utilization Program Report SP-5120, Dec. 1974, pp. 28-29.
"Flat Cable: Under-carpet breakthrough", Building Design & Construction, Apr. 1979, pp. 26-29.
"Under Carpet Power & Communication Wire System", Fleischhacker, Nov. 18-20, 1975.
"The Great Cover Up", undated.
"Flat Conductor Cable Building Wiring Systems", NASA, undated.

*Primary Examiner*—Roy N. Envall, Jr.
*Attorney, Agent, or Firm*—Robert M. Rodrick; Jesse Woldman

[57] ABSTRACT

A cable assembly for use in undercarpet wiring systems has a flat multiconductor cable encased in electrical insulation and an electrically conductive shield overlying the cable insulation, extending lengthwise with the cable and having successive extents which are respectively unsecured and secured to the cable. Electrical connection of the shield to the cable ground conductor is made redundantly at each such secured extent of the shield whereby physical continuity of the shield may be interrupted without interrupting electrical continuity of the shield to ground. Folded cable assemblies and methods for folding are set forth which facilitate cable directional change in wiring systems.

27 Claims, 13 Drawing Figures

MULTICONDUCTOR CABLE

FIELD OF THE INVENTION

The present invention relates generally to electrical cable systems, and, more particularly, to flat multiconductor cable assemblies which are installed on a floor substrate beneath carpeting.

BACKGROUND OF THE INVENTION

One presently known type of undercarpet cable system includes a flat multiconductor cable which is assembled between a plastic shield and a metallic shield. The cable assembly, comprising the cable and its two protective shields, is installed between a floor and overlying carpeting. The multiconductor cable includes a plurality of flat electrical conductors which are contained in a casing comprised of a thin sheet of electrical insulation. The plastic shield provides a cushion for the multiconductor cable so as to resist the abrasion and possible piercing of the cable insulation by projections extending upwardly from the floor, such projections being especially prevalent if the floor is made of concrete or a similar coarse building material. The metallic shield resists piercing of the cable insulation by an object inserted through the carpet. By electrically grounding the metallic shield, any electrically conductive object which may pierce the metallic shield and contact a "hot", i.e., electrically energized, conductor of the multiconductor cable will be grounded so as to protect a person who contacts the object from electrical hazard.

Inasmuch as the multiconductor cable and the two shields may not be positively attached to each other either before, during or after their installation, there is the possibility that the cable could be installed without the shields or that, once installed, the shields could move relative to the cable, thereby leaving a portion of the cable exposed either aside the metallic shield or the plastic shield. Such exposed cable runs a greater risk of being pierced than a properly covered cable and, therefore, presents an electrical hazard.

Where the metallic shield is properly positioned above the cable, there remains the possibility that the metallic shield will not be properly grounded, for instance, by failure to electrically connect it to ground. Like a properly grounded shield which is improperly installed so as to expose a portion of the cable, a cable having a nongrounded metallic shield presents a potentially hazardous situation.

Such known undercarpet wiring system includes a network of cable assemblies, the individual cable assemblies being electrically connected. In such a system, the metallic shield of each assembly is grounded by use of connectors for electrical connection of adjoining metallic shields. In such arrangement, shield grounding integrity is dependent on physical continuity of the shield. Thus, if the shield is interrupted as by cutting, the free remnant of the shield will not be electrically continuous to ground, with resulting hazard.

The formation of cable networks may require changes in the running direction of the cable assembly. The shields and cable of each cable assembly have not heretofore been collectively and simultaneously folded since known folding practice causes a reversal of the positions of the shields with respect to the cable, i.e., prior to folding the metallic shield would be above the cable and the plastic shield would be below the cable but, as a result of folding, the metallic shield would be below the cable and the plastic shield would be above the cable. Such a reversal in the relative positions of the shields is obviously undesirable.

For maintaining the metallic shield above the cable in the past, the direction of the cable assembly has been changed by folding the lower plastic shield along a predetermined bend line, folding the multiconductor cable along substantially the same bend line as the lower plastic shield, and then stacking the folded cable on top of the folded plastic shield. After folding the metallic shield along substantially the same bend line as the plastic shield and the cable, the folded metallic shield was stacked on top of the folded cable.

The bending and stacking technique described above suffers from several problems. First, inasmuch as the plastic shield, multiconductor cable, and metallic shield are not directly connected to each other, a slight difference in the bending line of any one of them will complicate the proper vertical alignment of the cable with at least one of the shields after the change of direction has been made in the cable assembly. Second, stacking the bent portions of the shields and cable on top of each other increases the profile of the cable assembly in the vicinity of the bend lines, thereby resulting in the possible formation of a lump in the overlying carpet. Moveover, such stacking is often difficult to achieve due to the tendency of loops formed in the shields and cable at the bend lines to slip on each other. Third, conductors which lie to the side of the medial longitudinal axis of the cable, undergo a reversal in position relative to the medial longitudinal axis of the cable, i.e., go from left to right thereof as a result of such folding. Such change may confuse an installer and give rise to error, particularly where termination apparatus at opposite ends of a folded cable assembly have commonly polarized terminals. Finally, any folding technique requires that the cable assembly be handled manually by an installer. Inasmuch as the edges of the cable and shields are very thin and relatively rigid, there is a risk that they will cut the installer, and known efforts have not sought to diminish such hazard.

SUMMARY OF THE INVENTION

The present invention has as its object the provision of a cable assembly which will lessen or overcome the foregoing disadvantages and potential hazards attending prior undercarpet wiring efforts.

In attaining this object, the invention provides a cable assembly having a flat multiconductor cable encased in electrical insulation and an electrically conductive shield overlying the cable insulation, extending lengthwise with the cable and having successive extents which are respectively unsecured and secured to the cable. Electrical connection of the shield to the cable ground conductor is made redundantly at each such secured extent of the shield whereby physical continuity of the shield may be interrupted without interrupting electrical continuity of the remnant shield to ground. In fabricating the cable assembly, the shield is preferably spot-welded at spaced locations to the cable ground conductor, the weldments extending through the cable insulation. The cable and shield are accordingly fixedly aligned with one another and misalignment hazards are avoided. The plastic shield is preferably also spot-secured to the cable assembly. Measures are taken to diminish edge cutting ability of the cable assembly, as noted below.

In accordance with the invention, connection of the shield continuously or intermittently to the cable prevents installation of the cable without the shield.

Since the shield is electrically connected to the ground conductor of the cable, the shields of two spliced cable assemblies are connected electrically as soon as their corresponding ground conductors are connected, without need for further connectors for electrically connecting the shields to ensure that they are properly grounded. The elimination of shield connectors saves the costs involved in providing the connectors as well as the time and additional costs involved in their installation. Furthermore, inasmuch as the shield may be severed anywhere along its length without destroying its connection to ground, the condition of the underlying cable or cable connectors may be inspected or observed simply by peeling back a severed portion of the metallic shield. By making the shield and the ground conductor from the same material, galvanic corrosion between the shield and the ground conductor will be inhibited.

In a cable folding aspect, the subject disclosure provides a method for laying flat multiconductor cable on a substrate in manner maintaining electrically-grounded overlayer protection therefor in the course of change in cable running direction from a first direction to a second direction. The practice involves securing, to one side of a cable, an electrically conductive shield and electrically ground-connecting the shield to the cable, laying of the cable and shield on the substrate in the first direction with the shield atop the cable, folding the cable and shield about a first fold line selected such that the cable and shield run from the first direction into a third direction different from the first direction and opposite to the second direction, and folding the cable and shield about a second fold line selected such that said cable and shield run from the third direction into the second direction. The shield thus remains atop all cable surface facing carpeting throughout the directional change. In further practice, accommodated by such redundant ground connection to the shield, that portion of the shield which is interior to the first fold, i.e., beneath the cable, may be removed, thereby lessening the profile of the cable assembly in the vicinity of the first fold.

The foregoing and other objects and features of the invention will be further evident from the following detailed description of preferred embodiments and practices and from the drawings wherein like reference numerals identify like parts throughout.

DESCRIPTION OF PREFERRED EMBODIMENTS AND PRACTICES

Figure 1:
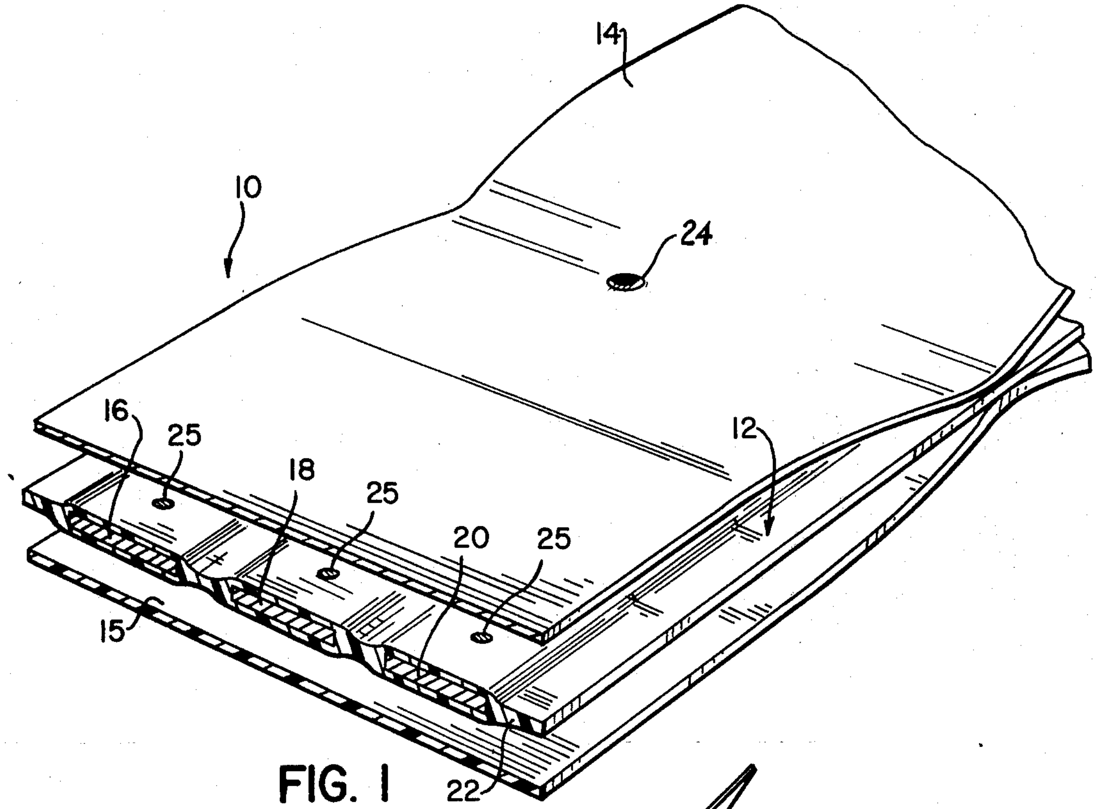
FIG. 1 is a perspective view of a cable assembly constructed in accordance with one aspect of the present disclosure.

Referring to FIG. 1, there is shown a flexible cable assembly 10 including a flexible multiconductor cable 12, an electrically conductive member constituted by a self-sustaining flexible metallic shield 14 positioned above the cable 12, and a flexible plastic shield 15 positioned below the cable 12. The multiconductor cable 12, the metallic shield 14, and the plastic shield 15 have about the same width and are flat such that the cable assembly 10 can be installed underneath a carpet (not shown) or some other similar type of floor covering.

The multiconductor cable 12 contains a plurality of flat electrical conductors 16, 18, 20, which are contained within a casing constituted by a thin sheet 22 of electrical insulation. The insulation 22 is preferably made from a laminate of polyester and polyvinylchloride. The polyvinylchloride is about four mils thick and is contiguous with the conductors 16, 18, 20, while the polyester is about one and one-half mils thick and forms the outer surface of the cable 12. The conductors 16, 18, 20, which are made from copper or any other good electrically conductive material, extend side-by-side along the entire length of the multiconductor cable 12.

In the embodiment shown in FIG. 1, the conductors 16 and 20, adjacent to the opposite longitudinally extending edges of the multiconductor cable 12, may be employed as hot conductors, the middle conductor 18 serving as a ground conductor. The ground conductor 18 is permanently connected, both mechanically and electrically, to the metallic shield 14 by a plurality of welds 24 which are arranged at intervals along the length of the cable assembly 10. Alternatively, the ground conductor 18 may be electrically and mechanically connected to the metallic shield 14 by a plurality of spaced-apart rivets or any other suitable fasteners. Also, the multiconductor cable 12 and the metallic shield 14 could be electrically and mechanically connected along the entire length of the cable assembly 10, so that the connection is continuous rather than intermittent. Indicia, such as color-coded markings 25, may be provided on the insulation 22 above and below the conductors 16, 18, 20 to distinguish them from each other.

The metallic shield 14 is made from a thin sheet of good electrically conductive metal, such as copper. Preferably, the metallic shield 14 and the conductors 16, 18, 20 are made from the same metal to prevent galvanic corrosion between the metallic shield 14 and the ground conductor 18. The metallic shield 14 functions as a protective barrier for resisting piercing of the multiconductor cable 12 by an object inserted through an overlying carpet. Even if a metallic object were to penetrate the metallic shield 14 and contact one of the hot conductors 16 and 20, the hot conductor will be grounded through the shield 14 and the ground conductor 18.

The plastic shield 15 is employed to provide a cushion for the multiconductor cable 12. As such, the plastic shield 15 can be made of any suitable flexible plastic, such as polyester, sufficiently strong to protect the multiconductor cable 12 from abrasion and possible piercing as a result of its installation on a floor, especially if the floor is made from concrete. The plastic shield 15, which may be permanently attached to the multiconductor cable 12 in any suitable manner, also inhibits the penetration of the multiconductor cable 12 by any projections extending upwardly from the floor. Preferably, shield 15 is secured to cable 12 insulation by heat-sealing thereof at locations spaced lengthwise of the shield.

The selective securement of shield 14 to cable 12 at locations mutually spaced lengthwise of the cable gives rise to successive shield extents which are respectively unsecured and secured to the cable. Thus, the extent of shield 14 downwardly of weld 24 in FIG. 1 is not secured to the cable. The successive extent of shield 14, i.e., adjacent weld 24, is secured to the cable. The next successive shield extent, upwardly of weld 24 in FIG. 1 is again not secured to the cable. This pattern preferably repeats along the cable length, with uniform or non-uniform shield extents, giving rise to redundant electrical connection of shield 14 to cable 12. Electrically conductive means are in registry with each secured shield extent. For example, the body of material comprising weldment 24, extends through the cable insulative casing, opposed terminal portions of the body having electrical connection to the shield and to an exclusive one of the cable conductors, respectively.

Figure 2:
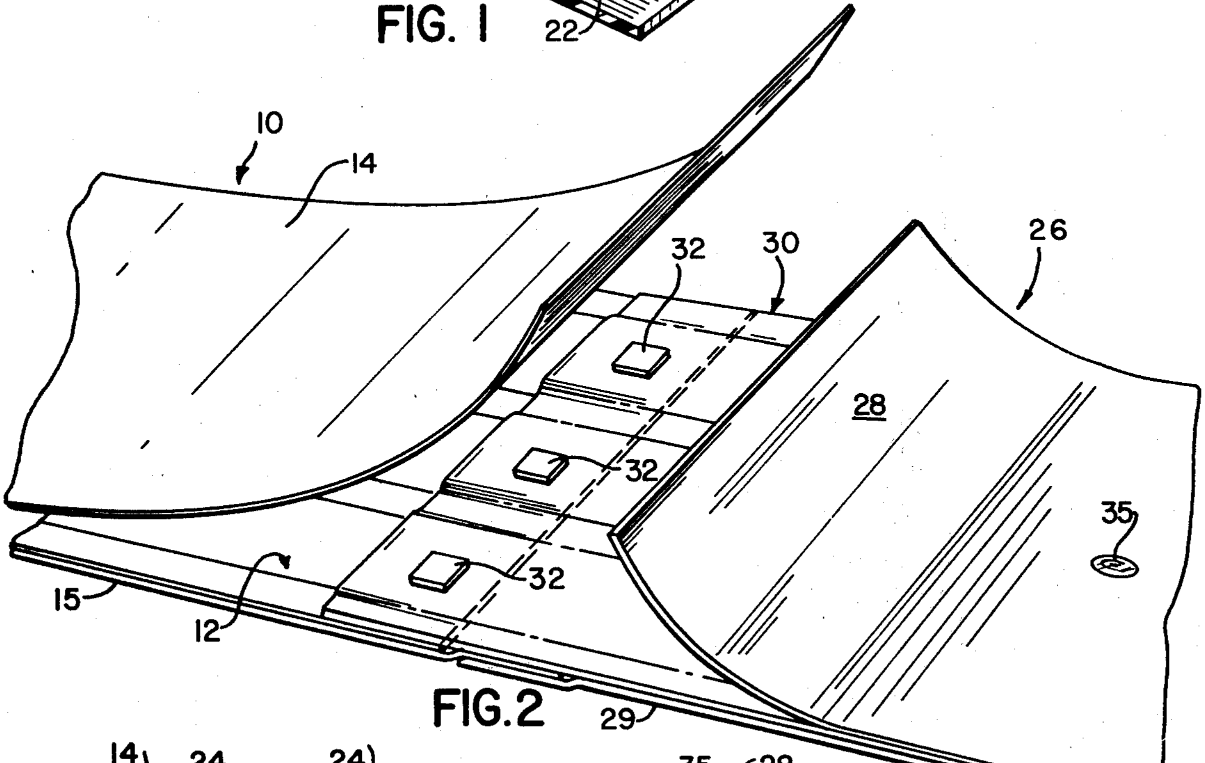
FIG. 2 is a perspective view of a pair of cable assemblies, each one being similar to the cable assembly of FIG. 1, which are spliced together.
Figure 3:
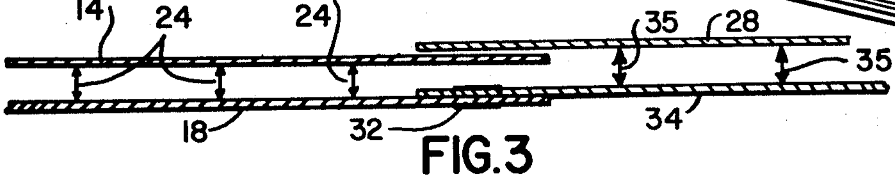
FIG. 3 is a schematic diagram showing the electrical connections between the spliced cable assemblies shown in FIG. 2.

As shown in FIGS. 2 and 3, the cable assembly 10 is joined to another identical cable assembly 26, having a metallic shield 28, a plastic shield 29, and a multiconductor cable 30 which is joined to the multiconductor cable 12 by connectors 32. It is not necessary to mechanically and electrically connect the lapping ends of metallic shields 14 and 28 to each other and to ground in order that they are properly grounded, inasmuch as the metallic shields 14, 28 are electrically connected to ground through welds 24 (indicated by arrows in FIG. 3 to illustrate the flow of electric current therethrough), the ground conductor 18 of the multiconductor cable 12, the corresponding one of the connectors 32, a ground conductor 34 of the multiconductor cable 30, and welds 35 (indicated by arrows in FIG. 3 to illustrate the flow of electric current therethrough) which mechanically and electrically connect the ground conductor 34 of the multiconductor cable 30 to the metallic shield 28. Thus, the lapping end portions of shields 14 and 28 may be peeled back (see FIG. 2) to inspect or observe the cables 12 and 30 or the connectors 32.

Figure 4:
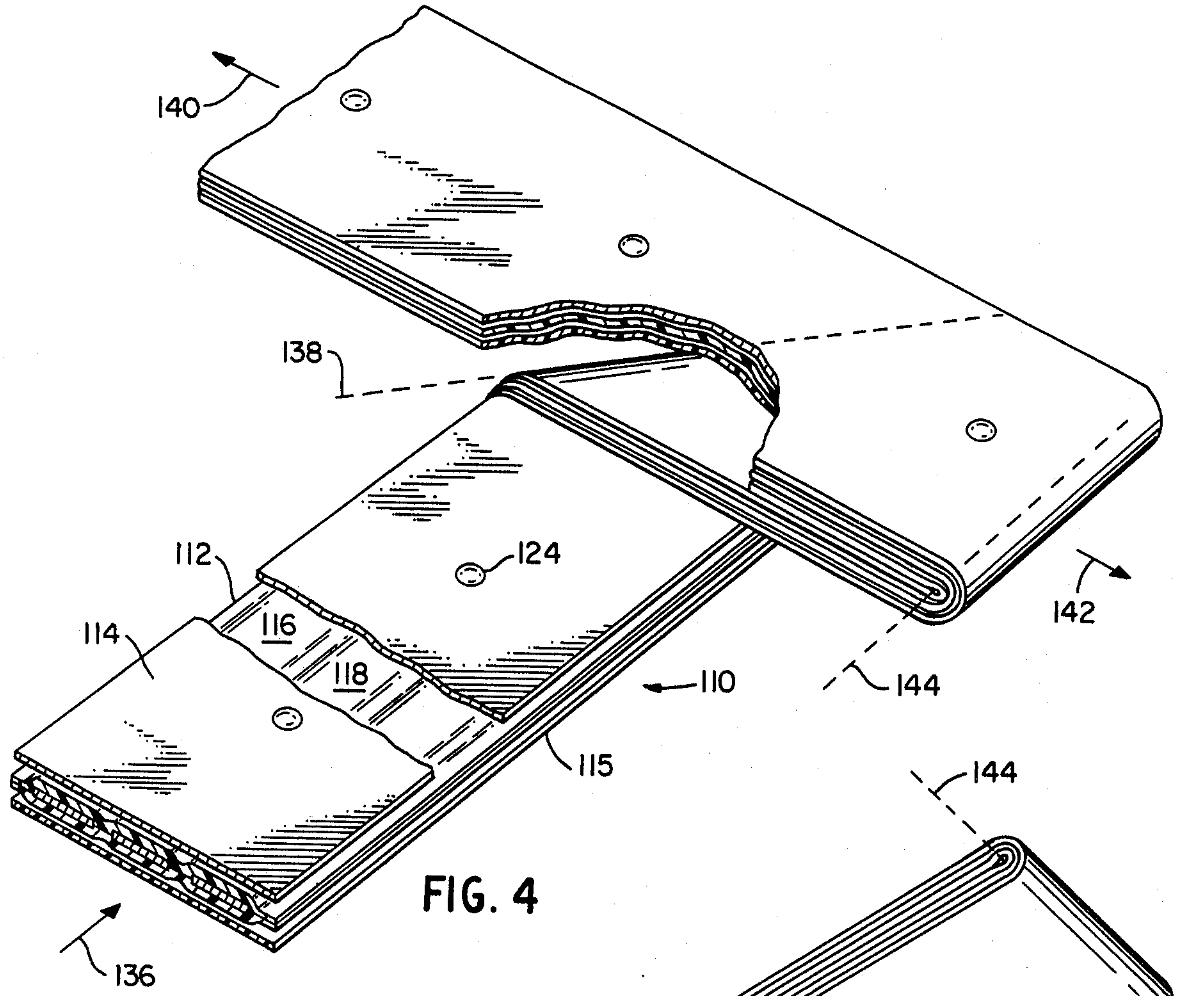
FIG. 4 is a perspective view showing a folding practice for use with the cable assembly illustrated in FIG. 1.

Referring now to FIG. 4 in which various elements described above with respect to FIG. 1 are designated by corresponding reference numerals increased by 100, there is shown a method for laying a cable assembly 110 which is to run in a first direction indicated by arrow 136 and includes a multiconductor cable 112, a metallic shield 114, spaced weldments 124 and a plastic shield 115. The cable assembly is required to run from such first direction 136 into second direction 140. In accordance with the present disclosure, such cable assembly direction change is accommodated with maintenance of electrically-grounded overlayer protection and with retention of conductor polarization at the cable assembly ends. The cable assembly is laid in first direction 136 on a floor or over substrate with cable 112 interposed between the substrate and shield 114. The cable assembly is now folded about first fold line 138, which is selected such that the assembly runs from first direction 136 into a third direction 142, different from first direction 136 and opposite to second direction 138. Following a short run in third direction 142, the cable assembly is folded about second fold line 144, which is selected such that the assembly runs from third direction 142 into second direction 140. While electrically-grounded overlayer protection is lost in the third direction 142 cable assembly run, wherein plastic shield 114 is atop cable 112, recovery of electrically-grounded overlayer protection is achieved for such third direction run upon commencement of the second direction run, wherein shield 114 again reverses position to ride atop cable 112. Thus, shield 114 rides atop all cable surface in facing relation to carpeting. Similarly, a plural positional reversal attends cable conductors in the direction change, thereby retaining polarization. Conductor 116 is polarized in position to the left of ground conductor 118 in the run of the cable assembly in direction 136. Immediately beyond fold line 138, the reverse is true, conductor 116 being to the right of conductor 118 in the direction of cable assembly run. Beyond fold line 144, however, conductor 116 returns to leftward position relative to the ground conductor. Terminal apparatus for connection to the opposite cable assembly ends may now be commonly polarized, i.e., bear like color or other indicia having correspondence with indicia of the cable assembly.

Figure 5:
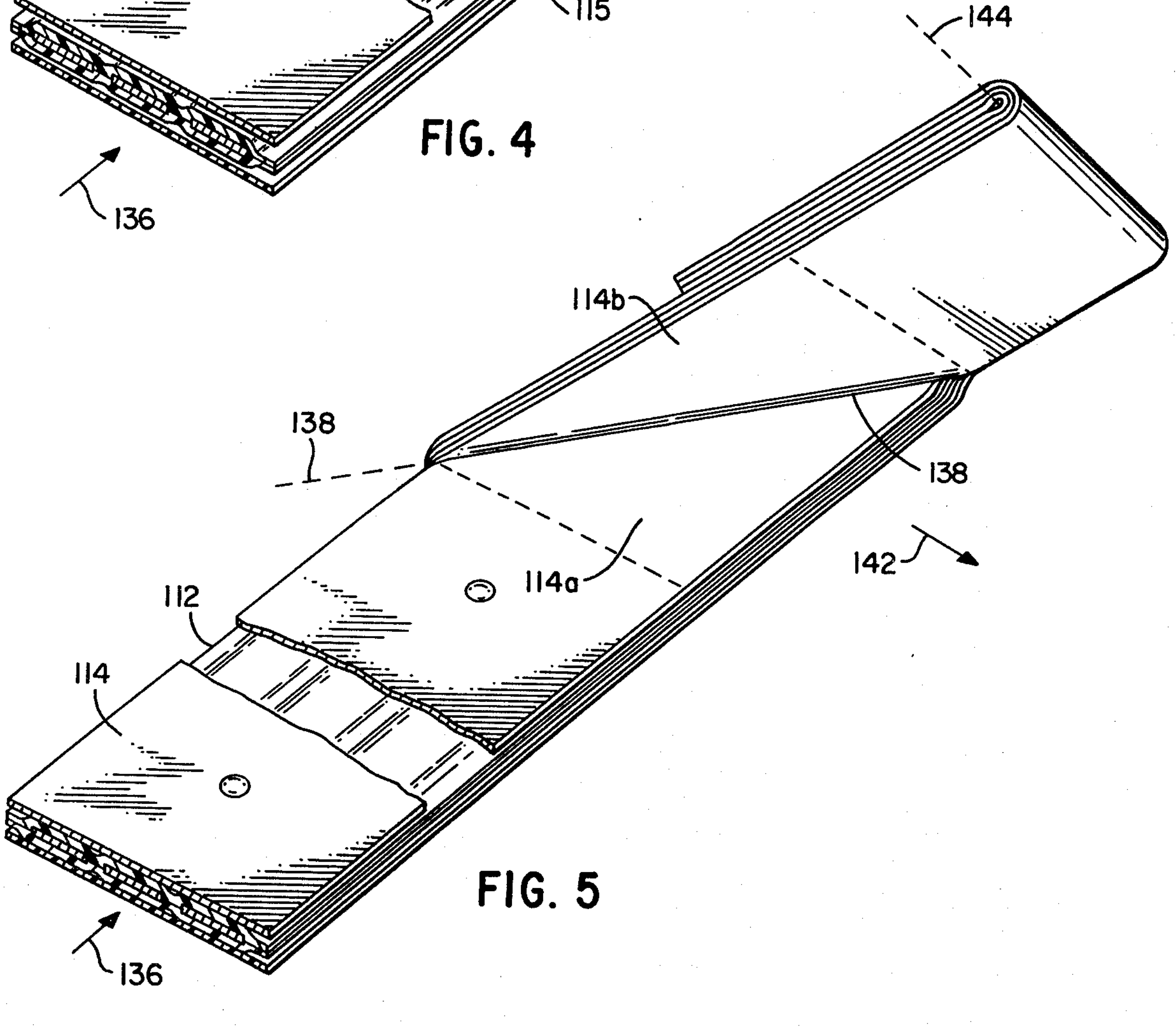
FIG. 5 is a perspective view of the folded assembly of FIG. 4 partially unfolded for indicating a shield removal feature of the disclosure.

Referring now to FIG. 5, the folded cable assembly of FIG. 4 is shown partially unfolded, i.e., the fold about fold line 138 is opened. In accordance with a further feature of the present disclosure, shield material may now be selectively removed for purposes of lessening the profile of the cable assembly in the vicinity of fold line 138. All or portions of shield areas 114*a* and 114*b*, which are directly folded upon each other and which are interior to the fold and, accordingly, unfunctional as protective overlayers, may be cut from the assembly. Shield electrical continuity to ground is unaffected by this practice based on the above-discussed electrical connection redundancy as between the shield and the cable.

Figure 6:
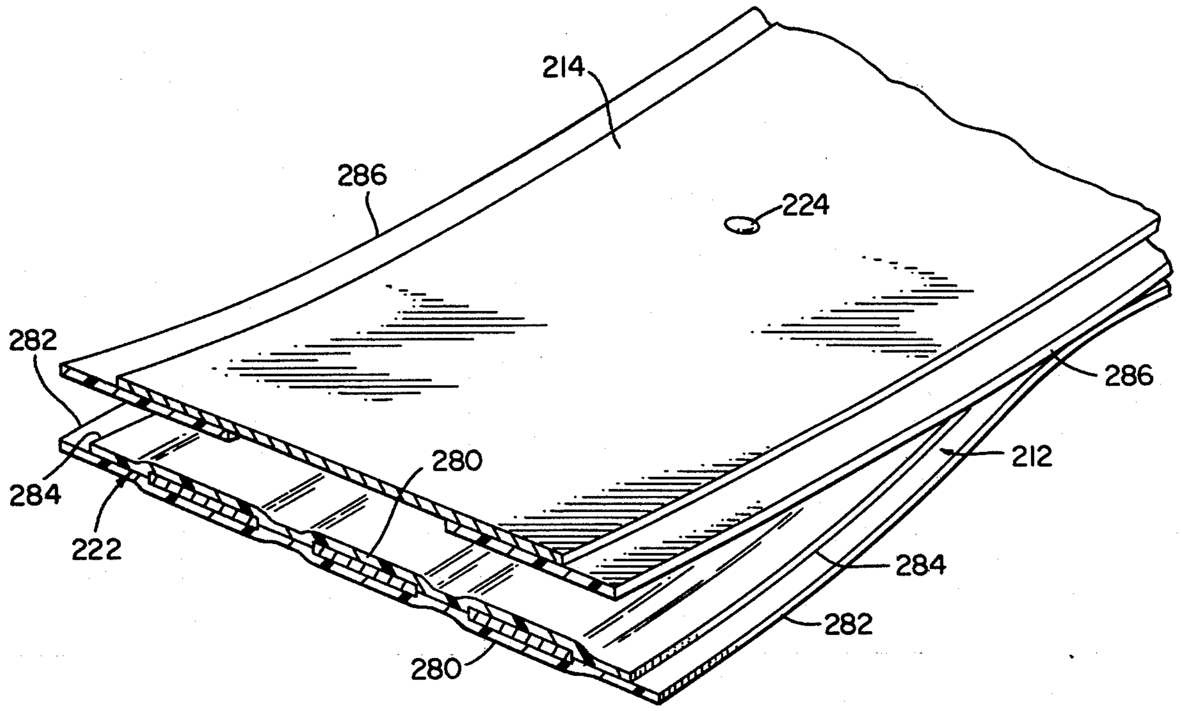
FIG. 6 is a perspective view of the cable assembly of FIG. 1, having edge protectors in accordance with a further aspect of the disclosure.

Referring to FIG. 6, there is shown a further aspect of the present disclosure wherein various elements which correspond to elements described above with respect to FIG. 1 are designated by corresponding reference numerals increased by 200. A multiconductor cable 212 included electric insulation 222 which is made from a pair of thin sheets 280 that are laminated together. In order to diminish the cutting ability of each longitudinally extending edge of the multiconductor cable 212, longitudinally extending edges 282 of the lower one of the sheets 280 extend laterally beyond longitudinally extending edges 284 of the upper one of the sheets 280 to decrease the thickness of the insulation 222 and, hence, increase the tendency of the insulation 222 to deform when contacted by the exposed or unprotected skin of an individual who is handling or installing the multiconductor cable 212. Of course, the upper one of the sheets 280 could be made wider than the lower one of the sheets 280. Alternatively, the sheets 280 can be the same width but vertically misaligned, so that an edge of each one of the sheets 280 overhangs a corresponding edge of the other one of the sheets 280.

Each longitudinally extending edge of a metallic shield 214 is provided with a resilient strip 286 of plastic, such as polyester. The flexibility of the plastic strips 286 is such that they are easily deformed when contacted by the exposed or unprotected skin of a handler or installer, thereby diminishing the cutting ability of the longitudinally extending edges of the metallic shield 214. The strips 286 could be replaced with a single plastic strip having a width which is greater than the width of the metallic shield 214. Furthermore, strips similar to the strips 286 could be applied to the multi-conductor cable 212 so as to render unnecessary any lateral extension of the longitudinally extending edges 282, 284 of the sheets 280.

Figure 7:
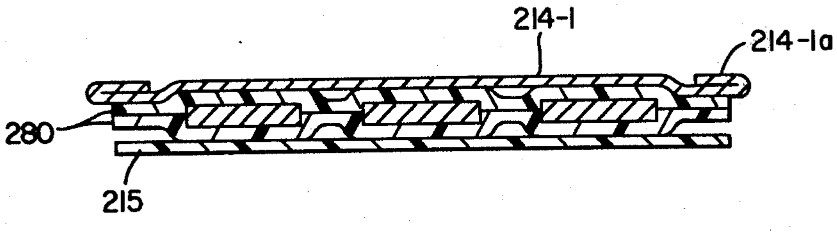
FIG. 7 is a sectional view of a cable assembly incorporating shield curls for edge protection.

In the safety embodiment shown in FIG. 7, the side marginal edges of electrically conductive shield 214-1 are curled, as shown at 214-1*a*, such that the shield surface contiguous with upper insulative sheet 280 is continuous and the end of the curled edge is disposed atop shield 214-1. The shield accordingly presents a rounded edge surface to the cable assembly user outwardly of the ends of sheets 280 and plastic shield 215. The cable insulation is also protected from possible cutting by the shield edge end by the chosen direction of the curl.

Referring now to FIGS. 8–13, there are shown further embodiments of the edge protectors of FIGS. 6 and 7. The various elements illustrated in FIGS. 8–13 which correspond to elements described above with respect to FIG. 6 are designated by corresponding reference numerals increased by 100, 200, 300, 400, 500, and 600, respectively.

The embodiments depicted in FIGS. 8–11 are especially useful in diminishing the cutting ability of a longitudinally extending edge of a multiconductor cable similar to the one shown in FIG. 6 and, therefore, will be described with particular reference to such a cable. Although the remaining embodiments, i.e., those shown in FIGS. 11–13, may also be used on a multiconductor cable similar to the one shown in FIG. 6, they will be described in connection with a metallic shield similar to the one illustrated in FIG. 6. Any of the edge protector embodiments may be used on a plastic shield similar to the one shown in FIG. 1, if it is desired to diminish the cutting ability of a longitudinally extending edge thereof.

Figure 8:
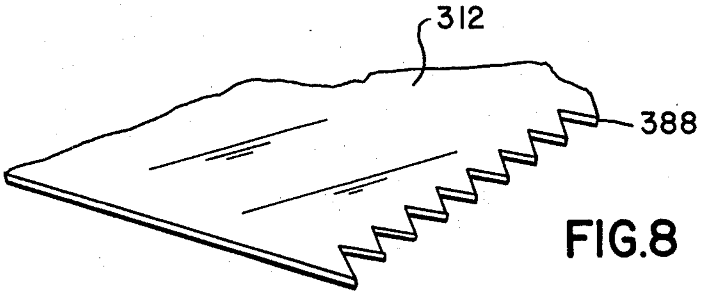
FIGS. 8–13 show further embodiments of cable edge protectors.
Figure 9:
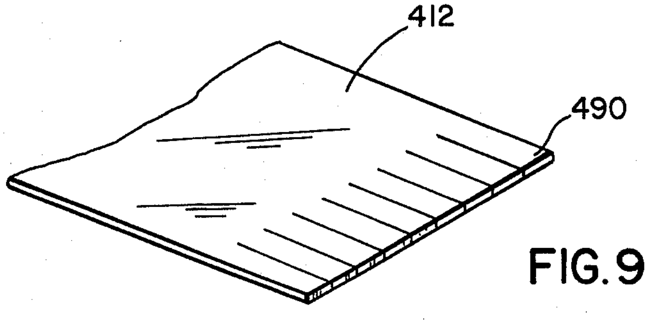
Figure 10:
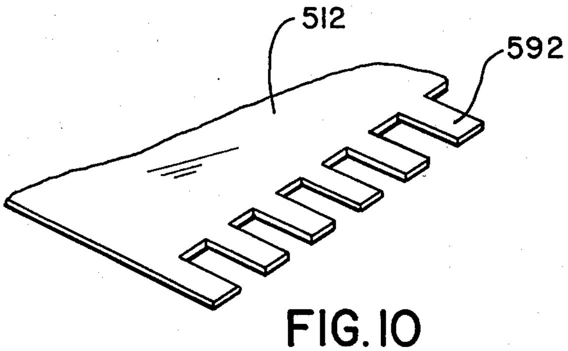

In FIG. 8, a longitudinally extending edge of a multiconductor cable 312 is serrated so that it has a plurality of pointed projections 388. Due to the decreasing vertical cross-sectional area of each of the projections 388, they may be readily deformed, thereby diminishing the cutting ability of the longitudinal edge. A longitudinally extending edge of a multiconductor cable 412 shown in FIG. 9 is slit so as to form a plurality of relatively blunt, readily deformable projections 490. As shown in FIG. 10, a plurality of relatively blunt, readily deformable projections 592, which extend laterally outwardly from a longitudinally extending edge of a multiconductor cable 512, are spaced further apart than the projections 490 of FIG. 9.

Figure 11:
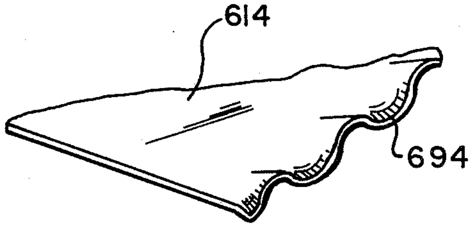
Figure 12:
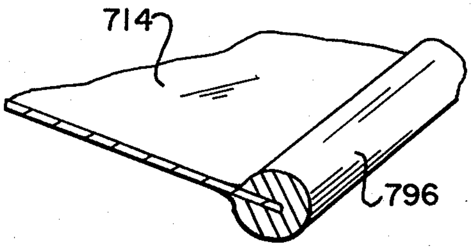
Figure 13:
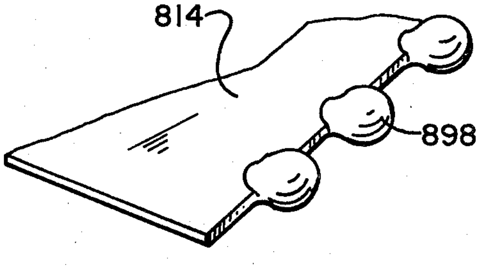

A longitudinally extending edge of a metallic shield 614 shown in FIG. 11 is provided with corrugations 694 to increase its contact area, thereby diminishing its cutting ability. As shown in FIG. 12, the contact area of a longitudinally extending edge of a metallic shield 714 is increased by providing it with a continuous cylindrical bead 796 which forms a blunt surface to diminish the cutting ability of the edge. A plurality of spaced-apart generally round beads 898 are provided on a longitudinally extending edge of a metallic shield 814 shown in FIG. 13 to diminish its cutting ability. Materials such as plastic, paint, glue and varnish can be used to form the bead 796 or the beads 898.

Various changes to the foregoing, specifically disclosed embodiments and practices will be evident to those skilled in the art. Accordingly, the foregoing preferred embodiments are intended in an illustrative and not in a limiting sense. The true spirit and scope of the invention is set forth in the following claims.

What is claimed is:

1. An electrical cable assembly comprising: an electrical cable having a plurality of flat conductors in an electrically insulative casing; and an electrically conductive member extending lengthwise with said cable, overlying said casing, and having successive lengthwise extents respectively secured and unsecured to said cable, the edges of said conductive member extending lengthwise with said cable including safety means for diminishing the cutting ability of said edges.

2. The cable assembly claimed in claim 1 including an electrically conductive means in registry with each such secured conductive member extent for providing electrical connection of said conductive member and said cable.

3. The cable assembly claimed in claim 2 wherein each said electrically conductive means provides electrical connection of said conductive member and an exclusive one of said flat conductors.

4. The cable assembly claimed in claim 3 wherein each said electrically conductive means comprises a body of electrically conductive material extending through said casing and having opposed terminal portions electrically connected respectively to said conductive member and said one flat conductor.

5. The cable assembly claimed in claim 4 wherein said body comprises a weldment.

6. The cable assembly claimed in claim 1 wherein said cable is elongate and has longitudinally spaced end margins and wherein such secured conductive member extents are longitudinally spaced from at least one of said end margins, whereby an unsecured conductive member extent is juxtaposed with said one end margin.

7. An electrical cable assembly comprising: an electrical cable having a plurality of flat conductors in an electrically insulative casing; and an electrically conductive member extending lengthwise with said cable, overlying said casing, and having successive lengthwise extents respectively secured and unsecured to said cable, said casing comprising a thin flat sheet, the longitudinally extending edges of said sheet being provided with safety means for diminishing the cutting ability of said edges thereof.

8. The cable assembly claimed in claim 1 wherein said safety means comprises resilient strip material secured to said conductive member and extending beyond said edges thereof.

9. The cable assembly claimed in claim 1 wherein said casing includes indicia means for distinguishing said flat conductors from each other.

10. The cable assembly claimed in claim 9 wherein said indicia means includes a plurality of color-coded markings.

11. An electrical cable assembly comprising:

(a) an electrical cable having a plurality of flat conductors in an electrically insulative casing;

(b) an electrically conductive member extending lengthwise with said cable and overlying said casing;

(c) a plurality of electrical connector means disposed in mutually spaced relation lengthwise of said conductive member for redundant electrical connection of said conductive member to an exclusive one of said flat conductors; and (d) safety means for diminishing the cutting ability of longitudinally extending edges of said conductive member.

12. The cable assembly claimed in claim 11 wherein each said electrical connector means comprises a body of electrically conductive material extending through said casing and having opposed terminal portions electrically connected respectively to said conductive member and said one flat conductor.

13. The cable assembly claimed in claim 12 wherein said body comprises a weldment.

14. The cable assembly claimed in claim 13 wherein said body also provides mechancal securement of said conductive member and said one flat conductor.

15. The cable assembly claimed in claim 11 wherein said cable is elongate and has longitudinally spaced ends and wherein said electrical connector means are longitudinally spaced from at least one of said ends.

16. In combination, in an electrical wiring system:

(a) first and second electrical cables having mutually overlapping end portions, each said cable having a plurality of flat conductors in an electrically insulative casing;

(b) electrical connector means for mutually securing said cable end portions and providing electrical connection between said flat conductors of said cables;

(c) a first electrically conductive member electrically connected to and extending lengthwise with said first cable, overlying said casing of said first cable and having successive lengthwise extents respectively secured and unsecured to said first cable; and (d) a second electrically conductive member electrically connected to and extending lengthwise with said second cable, overlying said casing of said second cable and having successive lengthwise extents respectively secured and unsecured to said second cable, at least one of such first and second electrically conductive members being in overlying disposition to said end portions of said first and second electrical cables and said electrical connector means.

17. The invention claimed in claim 16 including electrically conductive means in registry with each such secured extent of said first and second conductive members for providing electrical connection of each said conductive member and the underlying cable thereof.

18. The invention claimed in claim 17 wherein said electrically conductive means provides electrical connection of each said conductive member and an exclusive one of said flat conductors of the underlying cable thereof.

19. The invention claimed in claim 18 wherein each said electrically conductive means comprises a body of electrically conductive material extending through said casing of the underlying cable thereof and having opposed terminal portions connected respectively to said conductive member and said one flat conductor of the underlying cable thereof.

20. The invention claimed in claim 16 wherein unsecured terminal extents of said first and second conductive members are in mutually overlapping relation, such terminal extents each overlying said mutually overlapping end portions of said first and second cables.

21. In combination, in an electrical wiring system:

(a) first and second electrical cables having mutually overlapping end portions, each said cable having a plurality of flat conductors in an electrically insulative casing;

(b) a first electrically conductive member extending lengthwise in securement with said first cable and in overlying disposition to said casing of said first cable and having an end extent in unsecured overlying disposition to such first cable end portion;

(c) a second electrically conductive member extending lengthwise in securement with said second cable and in overlying disposition to said casing of said second cable and having an end extent in unsecured overlying disposition to said second cable;

(d) first electrical connector means for providing electrical connection between flat conductors of said cables in said mutually overlapping end portions thereof;

(e) second electrical connector means for providing electrical connection between said first electrically conductive member and a flat conductor of said first cable; and (f) third electrical connector means for providing electrical connection between said second electrically conductive member and a flat conductor of said second cable.

22. The invention claimed in claim 21 wherein said second electrically conductive member end extent is further in unsecured overlying disposition to said first electrically conductive member end extent.

23. In combination, in an electrical wiring system:

(a) first and second electrical cables having mutually overlapping portions, each said cable having a plurality of flat conductors in an electrically insulative casing;

(b) a first electrically conductive member extending lengthwise in securement with said first cable and in overlying disposition to said casing of said first cable and having an extent in unsecured overlying disposition to such cable mutually overlapped portions;

(c) a second electrically conductive member extending lengthwise in securement with said second cable and in overlying disposition to said casing of said second cable and having an end extent in unsecured overlying disposition to said second cable;

(d) first electrical connector means for providing electrical connection between flat conductors of said cables in said cable mutually overlapped portions thereof;

(e) second electrical connector means for providing electrical connection between said first electrically conductive member and a flat conductor of said first cable; and (f) third electrical connector means for providing electrical connection between said second electrically conductive member and a flat conductor of said second cable.

24. An electrical cable assembly comprising: an electrical cable having a plurality of flat conductors in an electrically insulative casing; a self-sustaining flexible electrically conductive member extending lengthwise with said cable, overlying said casing, and having successive lengthwise extents respectively secured and unsecured to said cable; and an electrically conductive means in registry with each such secured conductive member extent for providing electrical connection of said conductive member and said cable, one such unsecured conductive member extent constituting an end portion of said conductive member, such end portion being separable from said casing, while the secured portion adjacent said end portion remains secured to said casing and to said end portion, whereby electrical connections may be made to said conductors through said casing.

25. The cable assembly claimed in claim 24 wherein each said electrically conductive means provides electrical connection of said conductive member and an exclusive one of said flat conductors.

26. The cable assembly claimed in claim 25 wherein each said electrically conductive means comprises a body of electrically conductive material extending through said casing and having opposed terminal portions electrically connected respectively to said conductive member and such one flat conductor.

27. The cable assembly claimed in claim 26 wherein said body comprises a weldment of said one flat conductor and said conductive member.

* * * * *